United States Patent [19]

Asakawa

[11] Patent Number: 4,626,749
[45] Date of Patent: Dec. 2, 1986

[54] TWO-DIMENSIONAL POSITIONING DEVICE

[75] Inventor: Teruo Asakawa, Tokyo, Japan
[73] Assignee: Tokyo Electron Limited, Japan
[21] Appl. No.: 659,351
[22] Filed: Oct. 10, 1984
[51] Int. Cl.⁴ ............................................. H02K 41/00
[52] U.S. Cl. ................................... 318/135; 318/687; 310/12
[58] Field of Search ............ 318/687, 682, 135, 36–38, 318/115; 335/268; 310/49 R, 13, 12, 46

[56] References Cited

U.S. PATENT DOCUMENTS

| | | | |
|---|---|---|---|
| 3,376,578 | 4/1968 | Sawyer | 335/268 |
| 3,851,196 | 11/1974 | Hinds | 310/12 |
| 3,878,411 | 4/1975 | Nocito et al. | 310/12 |
| 3,881,139 | 4/1975 | Inaba et al. | 318/38 |
| 3,889,164 | 6/1975 | Nishizawa | 318/687 X |
| 3,935,486 | 1/1976 | Nagashima | 310/12 |
| 4,009,428 | 2/1977 | Sawyer | 318/687 X |
| 4,075,518 | 2/1978 | Koehler et al. | 310/49 R |
| 4,187,453 | 2/1980 | Rough | 318/135 |
| 4,230,978 | 10/1980 | Gardella | 318/135 X |
| 4,318,038 | 3/1982 | Munehiro | 318/135 |
| 4,390,827 | 6/1983 | Imahashi | 318/687 |
| 4,455,512 | 6/1984 | Cornwell et al. | 318/135 |

Primary Examiner—William M. Shoop, Jr.
Assistant Examiner—Patrick C. Keane
Attorney, Agent, or Firm—Lowe, Price, LeBlanc, Becker & Shur

[57] ABSTRACT

A plurality of coil sets are movably positioned in a plurality of magnetic fields which are arranged in a two-dimensional array. The magnetic fields periodically vary in strength and polarity along the two-dimensional array. The coil sets drive a loading table in the X and Y axes under the control of currents applied thereto.

12 Claims, 9 Drawing Figures

TWO-DIMENSIONAL POSITIONING DEVICE

BACKGROUND OF THE INVENTION

1. Field of the Invention

The present invention relates to a two-dimensional positioning device, and more specifically to such a device which includes a plurality of magnetic fields arranged two-dimensionally and a plurality of coil sets placed in the magnetic fields in order to control the position of a loading table or the like in the two dimensions, and still more specifically to such a device which finds useful applications in extremely accurate positioning of, for example, a semiconductor substrate during a manufacturing process. The present invention utilizes a phenomenon that a force is experienced by a current-carrying wire in a magnetic field.

2. Description of the Prior Art

In order to precisely position a loading table or the like in two dimensions, it is a common practice to use two driving means for driving the loading table in the two directions along the X and Y orthogonal coordinate axes, respectively. As such a driving means, a stepping motor or a rotary type D.C. servo motor has been utilized, wherein the rotary motion of the driving means is converted to linear motion by a feed screw or the like.

Such a driving means, however, is found to have difficulties in providing the loading table with fine displacement control of one micron meter or less. If an extremely fine displacement is required, then the screw pitches have to be made very fine, resulting in undesirable decreases of the driving speed. In order to achieve speedy, fine positionings of the loading table, a driving device has been proposed which includes two separate structures, one for coarse and the other for fine displacements. This prior art however is complicated and expensive. Further, the above-mentioned prior art has another problem in that two guides are required for limiting the displacements of the loading table in directions other than the intended X and Y directions.

B. A. Sawyer disclosed a two-axis magnetic system for driving chart plotters and other devices, entitled "Magnetic Positioning Device", in U.S. Pat. No. 3,376,578. This device however utilizes stepping motor technology, and hence is different in basic principle from the present invention.

On the other hand, there have been recent developments in D.C. linear motors, each of which is applicable to precise, speedy positionings of the loading table in one direction. However, in the case where D.C. linear motors are applied to two-dimensional positioning devices, two D.C. linear motors and two guide rails are required and hence the device is complicated in structure and expensive as described with the aforementioned prior art.

In an effort to solve the prior art difficulties, the inventor of the present invention has proposed improved positioning devices, which have been disclosed in Japanese patent applications Nos. 57-56344 and 57-57848.

Applications corresponding to Japanese applications Nos. 57-56344 and 57-57848 were filed in the United States (U.S. Pat. Nos. 4,536,278 and 4,555,650 respectively) claiming convention priorities. The devices in these applications, however, require some improvements because of a large number of coils and/or complicated control circuitry.

SUMMARY OF THE INVENTION

The object of the present invention is to provide a two-dimensional positioning device which is free from the aforementioned problems inherent in the prior art.

Another object of the present invention is to provide a two-dimensional positioning device which includes a plurality of magnetic fields arranged two-dimensionally and a plurality of coil sets placed in the magnetic fields in order to control the position of a loading table or the like in the two dimensions.

Still another object of the present invention is to provide a two-dimensional positioning device which does not require any guiding means for the movable or driven member.

Yet aother object of the present invention is to provide a two-dimensional positioning device which features an adjusting means for compensating for angular displacement of the movable member.

Still another object of the present invention is to provide a positioning system which includes a unique control system for the above-mentioned improved two-dimensional positioning device.

An aspect of the present invention takes the form of a two-dimensional positioning device comprising: a first magnetic field group which includes a plurality of first magnetic fields, the first magnetic fields being arranged in a first two-dimensional array, each of the first magnetic fields pointing in the direction perpendicular to a first plane including the first two-dimensional array; a second magnetic field group which includes a plurality of second magnetic fields, the second magnetic fields being arranged in a second two-dimensional array in the first plane, each of the second magnetic fields pointing in the direction opposite to the directions of the first magnetic fields, the first and second magnetic fields being positioned such that each magnetic field of each group is equidistantly surrounded by four magnetic fields which belong to the other magnetic field group; a first coil set which includes at least two coils and which is positioned in the first and second magnetic fields, the first coil set being allowed to freely move in a first direction in a second plane parallel to the first plane and being controlled in the displacement thereof through the control of currents flowing therethrough; and a second coil set which includes at least two coils and which is positioned in the first and second magnetic fields, the second coil set being allowed to move freely in a second direction in the second plane and being controlled in the displacement thereof through the control of currents flowing therethrough, the second direction being normal to the first direction.

BRIEF DESCRIPTION OF THE DRAWINGS

The features and advantages of the present invention will become more clearly appreciated from the following description taken in conjunction with the accompanying drawings in which like members or blocks are denoted by like reference numerals and in which.

DETAILED DESCRIPTION OF THE PREFERRED EMBODIMENTS

Figure 1:
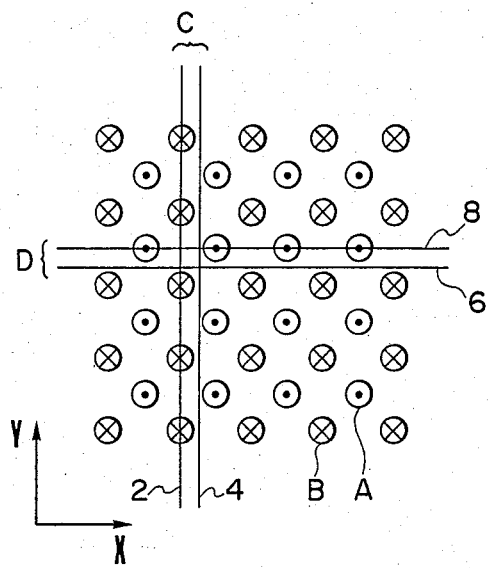
FIG. 1 is a diagram showing a plurality of magnetic fields arranged two-dimensionally and two wire sets in these magnetic fields.

FIG. 1 is a diagram which shows a principle underlaying the present invention.

Briefly, the present invention utilizes forces experienced by a plurality of current-carrying coils sets in a plurality of magnetic fields provided in the two dimensions. Each of the coil sets consists of at least two coils. It should be noted in FIG. 1 that four wires 2, 4, 6 and 8 are shown in place of four coils for the sake of simplicity.

In FIG. 1, the symbol • in a circle indicates a magnetic field pointing toward the reader, while x in a circle represents a magnetic field pointing away from the reader. As shown, there are two kinds of magnetic field groups A and B. The magnetic field group A includes the magnetic fields pointing in the direction indicated by the symbols •, while the magnetic field group B includes the magnetic fields pointing in the direction represented by the symbols x. The magnetic field groups A and B are arranged such that each magnetic field thereof is equidistantly surrounded by four magnetic fields belonging to the different group. A wire set C consisting of two wires 2 and 4, is adapted to move in the direction of the X axis, while another wire set D consisting of two independent wires 6 and 8, is driven in the direction of the Y axis. The two wire sets C and D are independently controlled in their displacements through the control of the directions and magnitudes of the currents applied to the wires.

Figure 2:
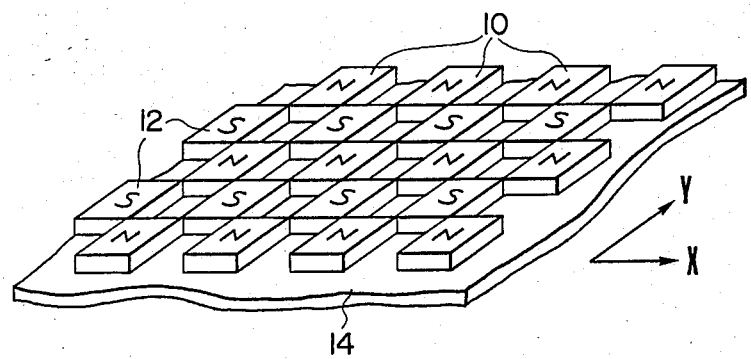
FIG. 2 is a perspective view of a plurality of magnetic field sources.

FIG. 2 is a perspective view of one arrangement of magnetic field sources for generating the magnetic fields A and B shown in FIG. 1. The magnetic field sources shown in FIG. 2 are permanent magnets but not limited thereto. The magnets 10 and 12 are arranged on a plate member 14 of magnetic material in such a manner that each magnet except for peripheral ones is surrounded by four magnets with different poles.

Before going into the details of the present invention, the underlaying principle thereof will further be discussed. Driving the loading table (not shown) along the X axis is the same as along the Y axis, so that only the driving manner along the Y axis will be described for simplicity.

As is well known, the magnitude of a force on a current-carrying wire in a magnetic field is given by $$F = BIL \quad (1)$$

where
F is a force,
B is a magnetic field strength,
I is a current flowing through the wire, and
L is an effective length of the wire.

Since the magnetic fields are arranged as shown in FIG. 1, the magnetic field strength varies periodically as a function of the displacement of the wire. This means that the magnitude of the force (F) becomes zero when the magnetic field strength is zero. Consequently, if only one wire is used for driving the loading table in one direction, the wire is unable to be displaced beyond one period of the magnetic field strength. In order to solve this problem, two or more wires are utilized for each driving direction such that at least one of the wires has to generate a force. Consequently, each of the wire sets C, D in FIG. 1 includes two wires.

The magnetic field strength varies periodically along the two-dimensional array, and may have various waveforms such as trapezoidal, rectangular or sinusoidal waveforms for example, depending on the arrangement of the magnetic field sources. In order to simplify control, it is preferable to make the waveform of the magnetic field strength sinusoidal. It is therefore assumed in this specification that the magnetic field sources are arranged such that the magnetic field strength varies sinusoidally along the two-dimensional array. As a consequence, the magnetic field strength B along the Y axis is given by $$B = B\max \sin y \quad (2)$$

wherein
Bmax is the maximum value of the magnetic field strength, and
"y" is a position of the wire in the direction of Y axis.

As mentioned above, one wire set including at least two wires is used for driving the loading table in each of the X and Y directions. It should be noted that the two wires of each set should be separated by 90° degrees (or one fourth of a magnetic field strength period) or by odd number multiples of ¼ of the period. Therefore, denoting the currents flowing through the two wires 6 and 8 by Ia and Ib, respectively, the corresponding forces (Fa and Fb) on the wires 6 and 8 are given by $$Fa = L B\max \sin (y) Ia \quad (3)$$

$$Fb = L B\max \cos (y) Ib \quad (4)$$

If Ia and Ib are controlled to take the form I cos (x) and I cos (y) respectively, then the total force on the wire set D is $$\begin{aligned} F &= Fa + Fb \quad (5) \\ &= L B\max (\sin^2(y) + \cos^2(y)) I \\ &= L B\max I \end{aligned}$$

This means that the total force on the wire set D is controlled by the current I.

Figure 3:
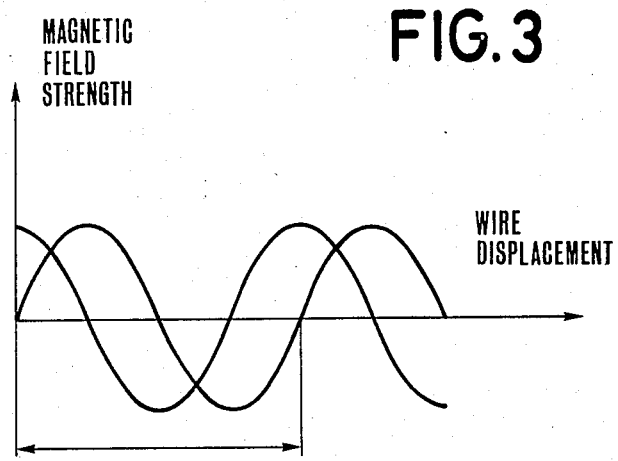
FIG. 3 is a graph in sine and cosine waveform showing magnetic field strengths along the magnetic field array.

FIG. 3 is a graph in sine and cosine waveform showing magnetic field strengths when the two wires spaced by 90° are displaced along the magnetic field array.

Figure 4:
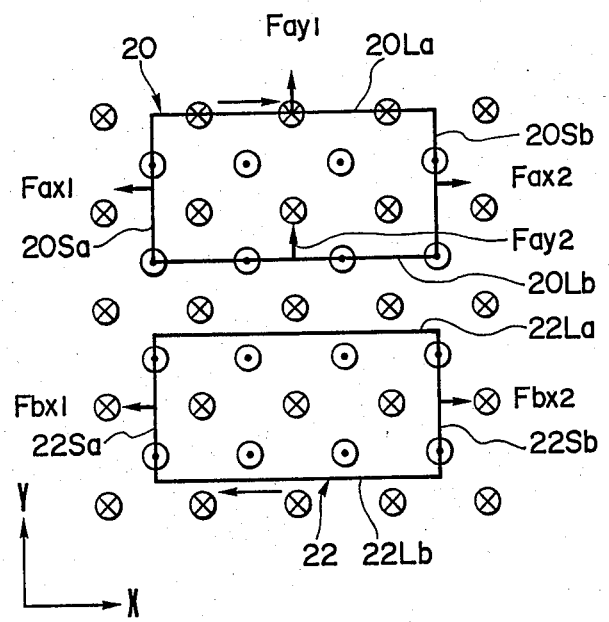
FIG. 4 is a diagram showing a plurality of magnetic fields arranged two-dimensionally and two coil sets in these magnetic fields.

FIG. 4 is a diagram showing two coils 20 and 22 placed in a plurality of magnetic fields whose arrangement is the same as shown in FIG. 1. The two coils 20 and 22 move as one set in the direction of the Y axis. It should be noted that the coil arrangement shown in FIG. 4 is an extension of the wire arrangement of FIG. 1. The short sides 20Sa and 20Sb of the coil 20 are spaced by three times the distance between the centers of adjacent like magnetic fields, while the long sides 20La and 20Lb thereof are spaced by three times one half of the distance between the centers of adjacent like magnetic fields. When a current Ia flows through the coil 20 in the direction shown by an arrow, the directions of the forces Fax1 and Fax2 on the short sides 20Sa and 20Sb are equal in magnitude but opposite in direction, and hence the force along the X axis is zero in total. On the other hand, the directions of the forces Fay1 and Fay2 on the long sides 20La and 20Lb are in the same direction, and hence the coil 20 is driven upwardly as seen in the drawing. With respect to the other coil 22, the long sides 22La and 22Lb are positioned at zero magnetic field, while the force along the X axis is also zero. As a result, the coil 22 is not driven in either direction. However, since the coils 20 and 22 are fixed to the loading table (not shown), the table is driven in the Y direction. It is generally understood that the two coils for each driving direction should satisfy the following conditions:

(1) the short sides of each coil is spaced by integer multiples of the distance between the centers of the adjacent like magnetic fields;

(2) the long sides of each coil is spaced by odd integer multiples of one half of the distance between the centers of the adjacent like magnetic fields; and (3) the two coils are spaced by odd number multiples of ¼ of the distance between the centers of the adjacent like magnetic fields.

Figure 5:
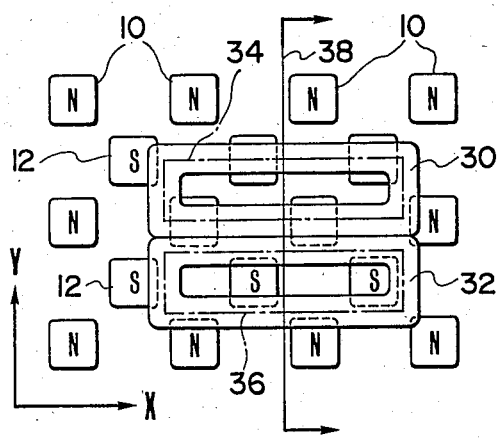
FIG. 5 is a diagram showing a plurality of magnetic field sources arranged two-dimensionally and two coil sets in these magentic fields.

FIG. 5 is a diagram showing two coils 30 and 32 each having a coil winding width and a plurality of magnetic field sources arranged as shown in FIGS. 1 and 4. The two coils 30 and 32 are for driving the loading table (not shown) in the Y axis. Broken lines 34 and 36 indicates one-turn-coils which are equivalent to the coils 30 and 32, respectively. It is readily apparent that the imaginary on-turn-coils 34 and 36 satisfy the above-mentioned conditions (1) through (3).

Figure 6:
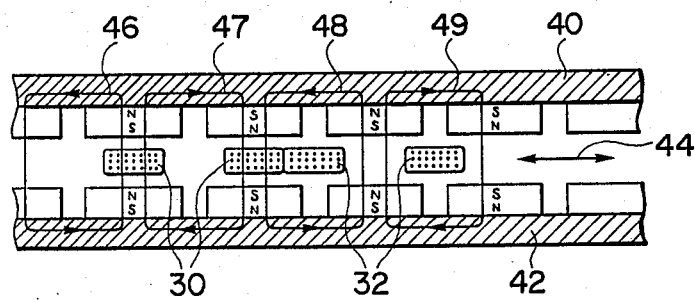
FIG. 6 is a sectional view taken along section line 38 of FIG. 5.

FIG. 6 is a cross sectional view taken along section line 38 of FIG. 5, although (a) upper and lower plate members 40 and 42 are added and (b) a plurality of magnets are carried by the upper plate member 40. The coils 30 and 32 are floated or freely supported by a suitable means such as an air bearing, and are driven in the Y direction shown by a double head arrow 44. The opposite magnets on the upper and lower plate members 40 and 42 have different poles, so that closed magnetic loops are generated as shown by reference numerals 46, 47, 48 and 49. It should be noted in FIG. 6 that the loading table is not shown for simplicity.

Figure 7:
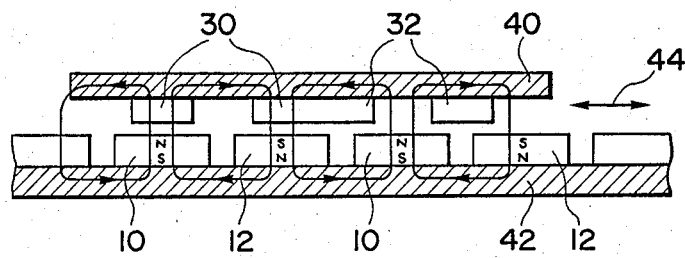
FIG. 7 is a cross sectional view showing a modification of the FIG. 6 arrangement.

FIG. 7 is a cross sectional view of a modification of the arrangement shown in FIG. 6. As shown in FIG. 7, the coils 30 and 32 are carried on the plate member 40. Although this modification is simpler in structure as compared with the FIG. 6 arrangement, the magnetic field strength of this modification is less than that of the FIG. 6 arrangement.

Figure 8:
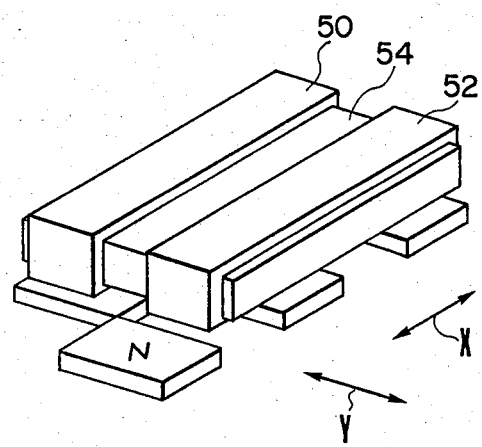
FIG. 8 is a perspective view showing another coil arrangement according to the present invention.

FIG. 8 is a perspective view of another coil arrangment suitable for use with the present invention. As shown in FIG. 8, each of the coils 50 and 52 carries a common magnetic core 54 and is arranged on the core 54 such that (a) the short sides thereof are parallel with the magnetic fluxes and (b) the long sides thereof are parallel with the magnetic field array (viz., normal to the magnetic fluxes). Consequently, no force is experienced by the short sides of the coil. The winding width of the coil should be less than one half of the distance between the centers of adjacent same magnetic fields, and, in the illustrated instance, the winding width is equal to one fourth of the distance in question, while each of the long sides of the coil should be longer than the distance.

In the case where the coil arrangment shown in FIG. 8 is used in place of the coils 30 and 32 shown in FIG. 5, the FIG. 8 coil arrangement can approximately double the efficiency as compared with the coils of FIG. 5. More specifically, the magnetic core 54 allows the magnetic fluxes from the upper and lower magnets (FIG. 5) to pass therethrough, and hence the flux density within the core 54 can be approximately doubled.

Figure 9:
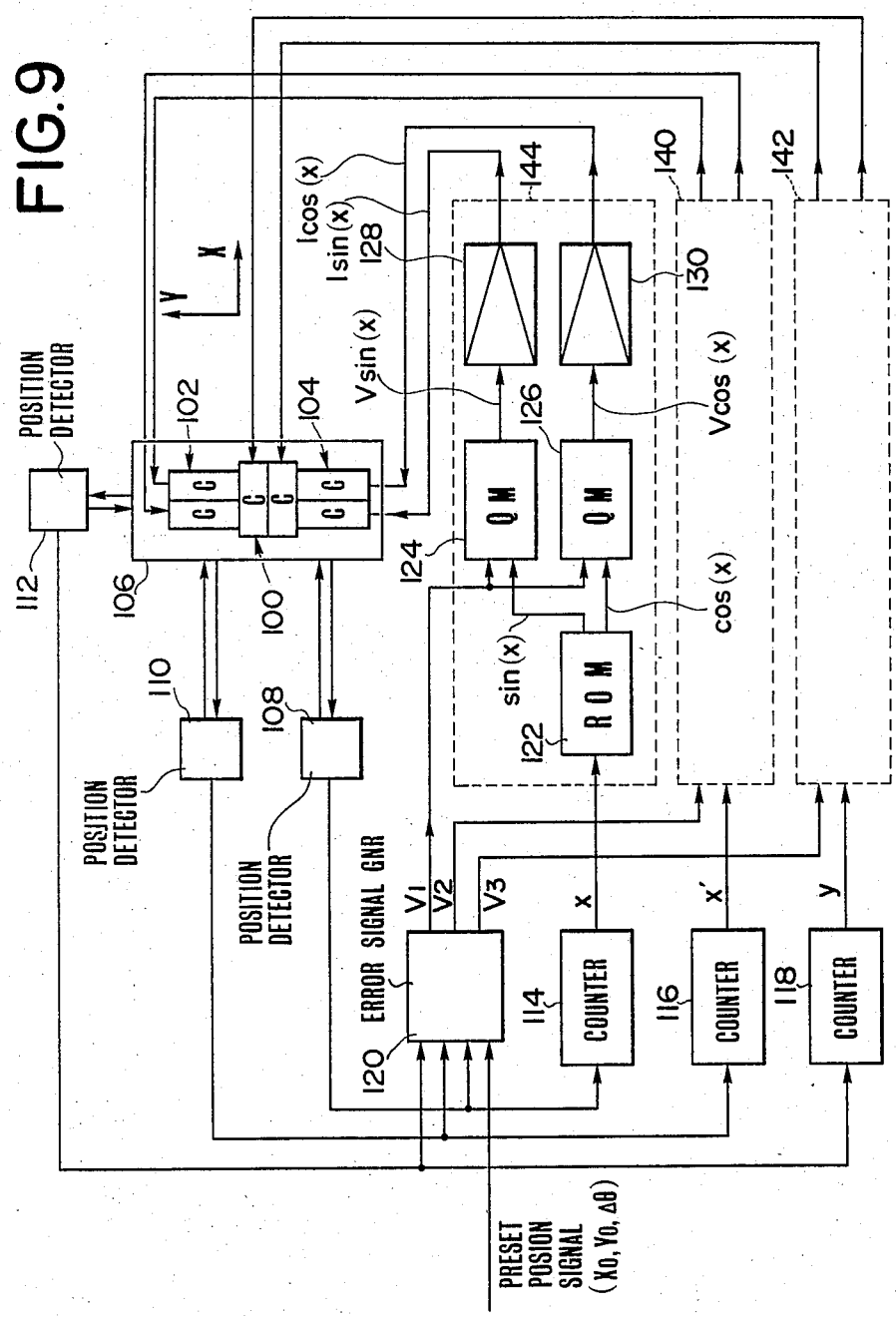
FIG. 9 is a block diagram showing a two-dimensional positioning device and control circuitry therefor.

FIG. 9 is a block diagram showing the two-dimensional positioning device according to the present invention together with control circuitry therefor. In FIG. 9, three coil sets 100, 102 and 104 are carried by the loading table 106. The coil set 100 drives the loading table 106 in the Y direction, while the coil sets 102 and 104 drive the table 106 in the X axis and also adjust or compensate for angular displacement of the table 106. The positions of the loading table 106 in the X and Y directions are detected by three position detectors 108, 110 and 112. Each position detector is of a conventional type utilizing laser beams, for example. The outputs of the detectors 108, 110 and 112 are applied to counters 114, 116 and 118, respectively, and are also applied to an error signal generator 120. The counters 114, 116 and 118 count up or down to determine the X and Y positions of the table 106. The counter 114 applies the output "x" thereof to ROM (read only memory) 122. The output "x" indicates the position of the lower portion (in the drawing) of the table 106 in the X axis. ROM 122 previously stores sine and cosine look-up tables, and supplies values of sin (x) and cos (x) to four-quadrant multipliers 124 and 126. On the other hand, the error signal generator 120 is also supplied with a preset position signal indicative of a desired position of the loading table 106. The preset position signal includes information of the desired positions of X and Y axes and an angular value to be adjusted or compensated for. Thereafter, the error signal generator 120 supplies the multipliers 124 and 126 with a voltage signal V1 which indicates the desired position of the lower portion of the table 106. The four-quadrant multipliers 124 and 126 perform multiplications and thence apply V sin (x) and V cos (x) to voltage-to-current converters (power amplifiers) 128 and 130. The converters 128 and 130 apply their outputs, viz., I sin (x) and I cos (x), to two coils of the coil set 104. Thus, the coil set 104 drives the lower portion of the table 106. The driving force has been discussed (see equation (5)). The controls of the other portions are readily understood from the foregoing, and hence further descriptions will be omitted for the sake of simplicity.

The foregoing description shows only preferred embodiments of the present invention. Various modifications are apparent to those skilled in the art without departing from the scope of the present invention which is only limited by the appended claims.

What is claimed is:

1. A two-dimensional positioning device comprising:
 a first magnetic field group which includes a plurality of first magnetic fields, said first magnetic fields being arranged in a first two-dimensional array, each of said first magnetic fields pointing in one direction perpendicular to a first plane including said first two-dimensional array;

a second magnetic field group which includes a plurality of second magnetic fields, said second magnetic fields being arranged in a second two-dimensional array in said first plane, each of said second magnetic fields pointing in the direction opposite to the direction of said first magnetic fields, said first and second magnetic fields being positioned such that each magnetic field of one of said first and second magnetic field groups is equidistantly surrounded by four magnetic fields which belong to the other magnetic field group;

a first coil set which includes at least two coils and which is positioned in said first and second magnetic fields, said first coil set being allowed to freely move in a first direction in a second plane parallel to said first plane;

a second coil set which includes at least two coils and which is positioned in said first and second magnetic fields, said second coil set being allowed to freely move in a second direction in said second plane, said second direction being normal to said first direction; and means for controlling currents flowing through said first and second coil sets thereby controlling displacement thereof in first and second perpendicular directions in said second plane;

said first and second magnetic fields being each regularly spaced by a common distance from one another in said first and second arrays, each coil of said first and second coil sets being substantially rectangular, one pair of opposing sides of the coil being spaced by integer multiples of the common distance between adjacent like magnetic fields, the other pair of opposing sides of the coil being spaced by an odd integer multiple of one half of the common distance between adjacent like magnetic fields, and the coils of each of said first and second coil sets being separated by an odd integer multiple of one fourth of the common distance between adjacent like magnetic fields.

2. A two-dimensional positioning device as claimed in claim 1, wherein said magnetic fields are arranged such that the magnetic field strength thereof changes substantially sinusoidally along the two-dimensional arrays thereof.

3. A two-dimensional positioning device claimed in claim 1, further comprising a third coil set which includes at least two coils, said third coil set being arranged in such a manner as to move in a direction parallel to one of said first and second directions in said second plane, and wherein said means further controls currents flowing through said third coil set.

4. A two-dimensional positioning device as claimed in claim 3, wherein said magnetic fields are arranged such that the magnetic field strength thereof changes substantially sinusoidally along the two-dimensional arrays thereof.

5. A two-dimensional positioning device as claimed in claim 3, wherein each coil of said third coil set being substantially rectangular, one pair of opposing sides of the coil being spaced by integer multiples of the common distance between adjacent like magnetic fields, the other pair of opposing sides of the coil being spaced by an odd integer multiple of one half of the common distance between adjacent like magnetic fields, and wherein the coils of said third coil set are separated by an odd integer multiple of one fourth of the common distance between adjacent like magnetic fields.

6. A two dimensional positioning device as claimed in claim 5 wherein said one pair of opposing sides of said coil have a shorter dimension than the other pair of opposing sides.

7. A two-dimensional positioning device as claimed in claim 1, wherein said first and second magnetic fields are each regularly spaced by a common distance from one another in said first and second arrays, each of said first and second coil sets are arranged such that said one pair of opposing sides thereof are normal to said first plane.

8. A two-dimensional positioning device as claimed in claim 7, wherein each of said first and second coil sets carries a magnetic core.

9. A two dimensional positioning device as claimed in claim 7 wherein said one pair of opposing sides of said coil have a shorter dimension than the other pair of opposing sides.

10. A two dimensional positioning device as claimed in claim 1 wherein said one pair of opposing sides of said coil have a shorter dimension than the other pair of opposing sides.

11. A two-dimensional positioning device comprising:

a first magnetic field group which includes a plurality of first magnetic fields, said first magnetic fields being arranged in a first two-dimensional array, each of said first magnetic fields pointing in one direction perpendicular to a first plane including said first two-dimensional array;

a second magnetic field group which includes a plurality of second magnetic fields, said second magnetic fields being arranged in a second two-dimensional array in said first plane, each of said second magnetic fields pointing in the direction opposite to the direction of said first magnetic fields, said first and second magnetic fields being positioned such that each magnetic field of one of said first and second magnetic field groups is equidistantly surrounded by four magnetic fields which belong to the other magnetic field group;

a first coil set which includes at least two coils and which is positioned in said first and second magnetic fields, said first coil set being allowed to freely move in a first direction in a second plane parallel to said first plane;

a second coil set which includes at least two coils and which is positioned in said first and second magnetic fields, said second coil set being allowed to freely move in a second direction in said second plane, said second direction being normal to said first direction;

means for controlling currents flowing through said first and second coil sets thereby controlling displacement thereof in first and second perpendicular directions in said second plane;

said magnetic fields are arranged such that the magnetic field strength thereof changes substantially sinusoidally along the two-dimensional arrays thereof thereby to generate a current controlled position independent force on said first and second coil sets in said first and second directions, respectively.

12. A two-dimensional positioning device comprising:

a first magnetic field group which includes a plurality of first magnetic fields, said first magnetic fields being arranged in a first two-dimensional array, each of said first magnetic fields pointing in one direction perpendicular to a first plane including said first two-dimensional array;

a second magnetic field group which includes a plurality of second magnetic fields, said second magnetic fields being arranged in a second two-dimensional array in said first plane, each of said second magnetic fields pointing in the direction opposite to the direction of said first magnetic fields, said first and second magnetic fields being positioned such that each magnetic field of one of said first and second magnetic field groups is equidistantly surrounded by the four magnetic fields which belong to the other magnetic field group;

a first coil set which includes at least two coils and which is positioned in said first and second magnetic fields, said first coil set being allowed to freely move in a first direction in a second plane parallel to said first plane;

a second coil set which includes at least two coils and which is positioned in said first and second magnetic fields, said second coil set being allowed to freely move in a second direction in said second plane, said second direction being normal to said first direction; and means for controlling currents flowing through said first and second coil sets thereby controlling displacement thereof in first and second perpendicular directions in said second plane;

said first and second magnetic fields being each regularly spaced by a common distance from one another in said first and second arrays, each coil of said first and second coil sets being substantially rectangular, one pair of opposing sides of the coil being spaced by integer multiples of the common distance between adjacent like magnetic fields thereby to generate opposing cancelling forces along one direction separating said one pair of opposing sides, the other pair of opposing sides of the coil being positioned in said first and second magnetic fields and spaced by an odd integer multiple of one half of the common distance between adjacent like magnetic fields thereby to generate forces summing to a substantially constant force along another direction separating said other pair of opposing sides, and the coils of each of said first and second coil sets being separated by an odd integer multiple of one fourth of the common distance between adjacent like magnetic fields.

* * * * *